United States Patent
Okuya

(10) Patent No.: US 11,867,835 B2
(45) Date of Patent: Jan. 9, 2024

(54) SYSTEM AND METHOD FOR CLASSIFYING PULSES GENERATED BY A SENSOR

(71) Applicant: Denso Corporation, Kariya (JP)

(72) Inventor: Tsubasa Okuya, Kariya (JP)

(73) Assignee: Denso Corporation, Kariya (JP)

( * ) Notice: Subject to any disclaimer, the term of this patent is extended or adjusted under 35 U.S.C. 154(b) by 489 days.

(21) Appl. No.: 17/094,271

(22) Filed: Nov. 10, 2020

(65) Prior Publication Data

US 2022/0146628 A1     May 12, 2022

(51) Int. Cl.
*G01S 7/48* (2006.01)
*G01S 17/10* (2020.01)
*G01S 17/86* (2020.01)

(52) U.S. Cl.
CPC ............ *G01S 7/4802* (2013.01); *G01S 17/10* (2013.01); *G01S 17/86* (2020.01)

(58) Field of Classification Search
CPC ........ G01S 7/4802; G01S 17/10; G01S 17/86; G01S 17/931
See application file for complete search history.

(56) References Cited

U.S. PATENT DOCUMENTS

| | | | |
|---|---|---|---|
| 8,781,790 B2 | 7/2014 | Zhu et al. | |
| 2011/0313722 A1* | 12/2011 | Zhu | G01S 17/48 702/159 |
| 2019/0293769 A1* | 9/2019 | Subasingha | G01S 17/02 |
| 2021/0132197 A1* | 5/2021 | Wachter | G01S 17/931 |
| 2021/0156973 A1* | 5/2021 | Kapusta | G01S 7/487 |
| 2022/0026544 A1* | 1/2022 | Wu | G01S 7/4808 |

FOREIGN PATENT DOCUMENTS

| | | | |
|---|---|---|---|
| DE | 102009057104 A1 * | 6/2011 | ............ F16P 3/14 |
| JP | H0862331 A | 3/1996 | |
| JP | 2004272841 A | 9/2004 | |

* cited by examiner

*Primary Examiner* — Isam A Alsomiri
*Assistant Examiner* — Joseph C Fritchman
(74) *Attorney, Agent, or Firm* — Christopher G. Darrow; Darrow Mustafa PC

(57) ABSTRACT

A system for classifying pulses from a sensor configured to detect one or more objects includes a processor and a memory in communication with the processor. The memory has a pulse classification module having instructions that, when executed by the processor, cause the processor to obtain a signal having a pulse and classify the pulse as one of: (1) a single object pulse indicating that the one or more objects represented by the pulse is a single object and (2) a plurality of objects pulse indicating that the one or more objects represented by the pulse are multiple objects. The classification of the pulse may utilize one or more of the following: a pulse width of the pulse, a rising slope of the pulse during a rising period, a falling slope of the pulse during a falling period, and a saturating width of the pulse.

17 Claims, 11 Drawing Sheets

SYSTEM AND METHOD FOR CLASSIFYING PULSES GENERATED BY A SENSOR

TECHNICAL FIELD

The subject matter described herein relates, in general, to systems and methods for classifying pulses generated by a sensor and, more specifically, by pulses generated by a light detection and ranging ("LIDAR") sensor.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with sensors for sensing objects located near the vehicle. Some of these sensors may include camera sensors, sonar sensors, radar sensors, and LIDAR sensors. LIDAR sensors are a type of sensor that utilizes light to measure distances in the form of a laser. More specifically, LIDAR sensors include a transmitter, which may be in the form of a pulsed laser that emits laser light, and a receiver that is configured to receive reflections of the laser light reflected by a target object. In response to receiving the reflected laser, the sensor generates a signal that may include one or more pulses. By measuring one or more properties of these pulses, such as the rising edge of the pulse, one may be able to determine the distance to the target object In some cases, if the target object is located behind a floating object, such as steam, fog, vehicle exhaust, rain, snow, or splashing water caused by the movement of a vehicle through a puddle, the rising edge of the pulse may be caused by the floating object and not the target object. As such, the pulse's rising edge may not help determine the distance to the target object, as the floating object obscures it.

One solution to this problem involves using the falling edge of the pulse to determine distance. However, if a target object has high reflectivity, such as reflectors or delineators mounted on an automobile's rear body, the reflected laser's intensity will generate a pulse that exceeds the sensor's dynamic range, causing saturation. Saturated pulses generally need a longer time to fall to a baseline level. Because of this delay, the falling edge of the pulse cannot be equated to distance.

SUMMARY

This section generally summarizes the disclosure and is not a comprehensive explanation of its full scope or all its features.

In one example, a system includes a processor and a memory in communication with the processor. The memory may include a pulse classification module that has instructions that, when executed by the processor, cause the processor to obtain a signal having a pulse from a sensor configured to detect one or more objects and classify the pulse as one of: (1) a single object pulse indicating that the one or more objects represented by the pulse is a single object and (2) a plurality of objects pulse indicating that the one or more objects represented by the pulse are multiple objects. This classification may be based on at least one of a pulse width of the pulse, a rising slope of the pulse during a rising period, a falling slope of the pulse during a falling period, and/or a saturating width of the pulse.

In another example, a method for determining the number of objects represented by a pulse generated by an object detection sensor includes the steps of obtaining a signal having a pulse from a sensor configured to detect one or more objects and classifying the pulse as one of: (1) a single object pulse indicating that the one or more objects represented by the pulse is a single object and (2) a plurality of objects pulse indicating that the one or more objects represented by the pulse are multiple. Like before, this classification may be based on at least one of a pulse width of the pulse, a rising slope of the pulse during a rising period, a falling slope of the pulse during a falling period, and/or a saturating width of the pulse.

In yet another example, a non-transitory computer-readable medium stores instructions that, when executed by a processor, cause the processor to obtain a signal having a pulse from a sensor configured to detect one or more objects and classify the pulse as one of: (1) a single object pulse indicating that the one or more objects represented by the pulse is a single object and (2) a plurality of objects pulse indicating that the one or more objects represented by the pulse are multiple objects Like before, this classification may be based on at least one of a {01220576} 2 pulse width of the pulse, a rising slope of the pulse during a rising period, a falling slope of the pulse during a falling period, and/or a saturating width of the pulse.

Further areas of applicability and various methods of enhancing the disclosed technology will become apparent from the description provided. The description and specific examples in this summary are intended for illustration only and are not intended to limit the present disclosure's scope.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One element may be designed as multiple elements in some embodiments, or multiple elements may be designed as one element. In some embodiments, an element shown as an internal component of another element may be implemented as an external component and vice versa. Furthermore, elements may not be drawn to scale.

DETAILED DESCRIPTION

Described is a system and method for classifying pulses generated by a sensor, such as a LIDAR sensor. As described in the background section, floating objects, such as vehicle exhaust, fog, rain, snow, splashing water, and the like, can obscure a target object. Some sensors, such as LIDAR sensors, measure the timing and/or intensity of light reflected from target objects. When floating objects obscure target objects, pulses generated by the sensor may contain interference generated by the floating object.

The system and method can determine by analyzing one or more pulse properties if the pulse represents a single object or represents multiple objects, such as the target object and a floating object. The system and method may utilize the pulse's properties, such as the pulse width of the pulse, the rising slope of the pulse during a rising period, the falling slope of the pulse during a falling period and/or a saturating width of the pulse. Using this information, the system and method can classify the pulse as a single object pulse, indicating that the pulse represents a single object or plurality of objects pulse indicating that the pulse represents multiple objects, such as the target object and a floating object. This classification can then be used by downstream processes, such as object detection systems, motion planning systems, and the like, to detect objects more accurately and/or plan movements.

Figure 1:
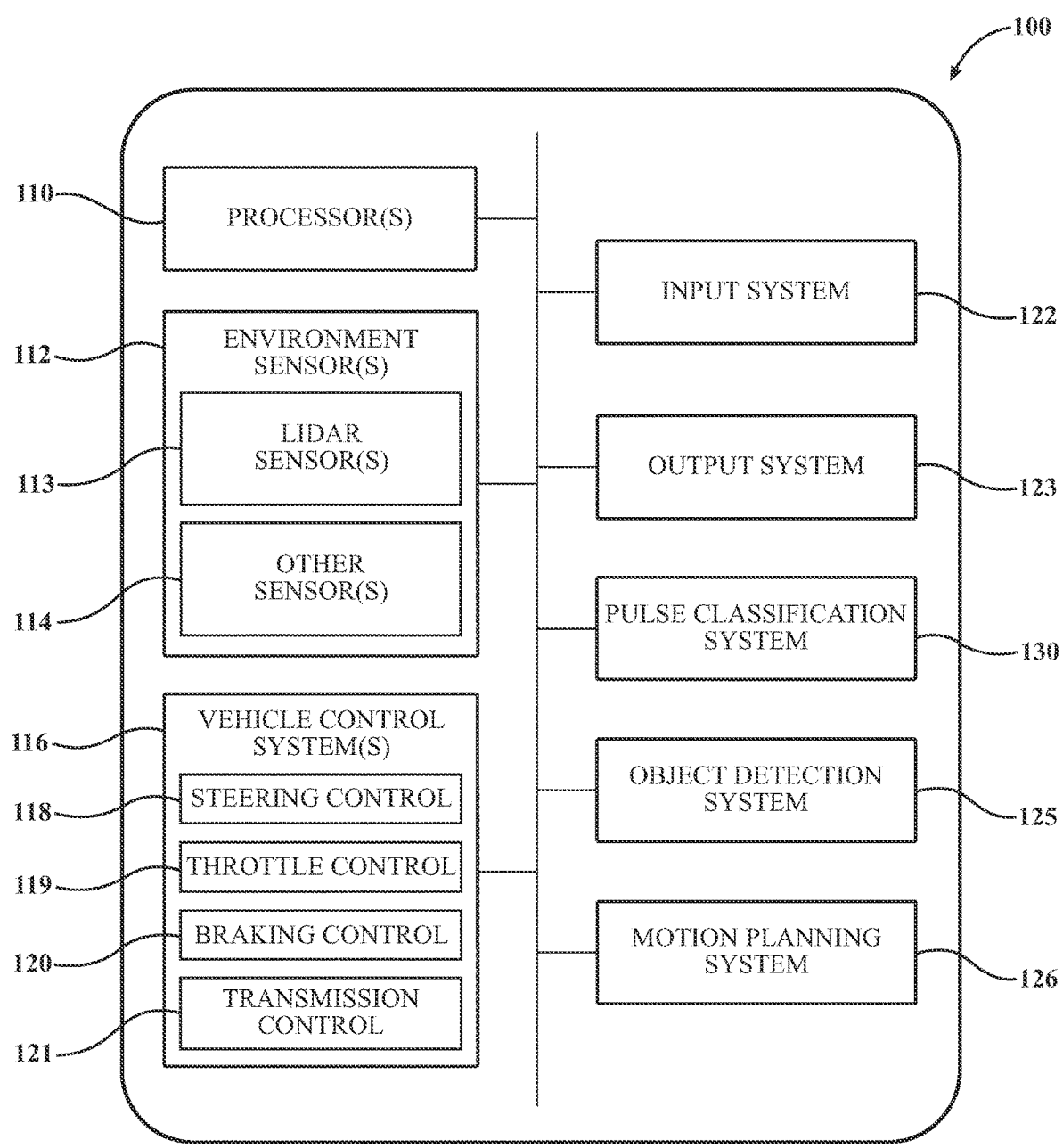
FIG. 1 illustrates a vehicle incorporating a pulse classification system.

Referring to FIG. 1, an example of a pulse classification system 130 incorporated within a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems and thus benefits from the functionality discussed herein. In other examples, instead of a vehicle 100 or another robotic device, the system may be an object detection system that can receive information, such as signals containing pulses from a LIDAR sensor, and determine the presence of one or more objects in the information.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). The autonomous system may provide semi-autonomous control or fully autonomous control, as discussed in relation to the motion planning system 126.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 may include a pulse classification system 130. The pulse classification system 130 can obtain pulses generated from one or more environment sensor(s) 112, which could include one or more LIDAR sensor(s) 113 and/or pulses from other sensor(s) 114. These other sensor(s) 114 could include radar sensors, sonar sensors, camera sensors, or any sensor that generates a pulse in response to detecting one or more objects.

Figure 2:
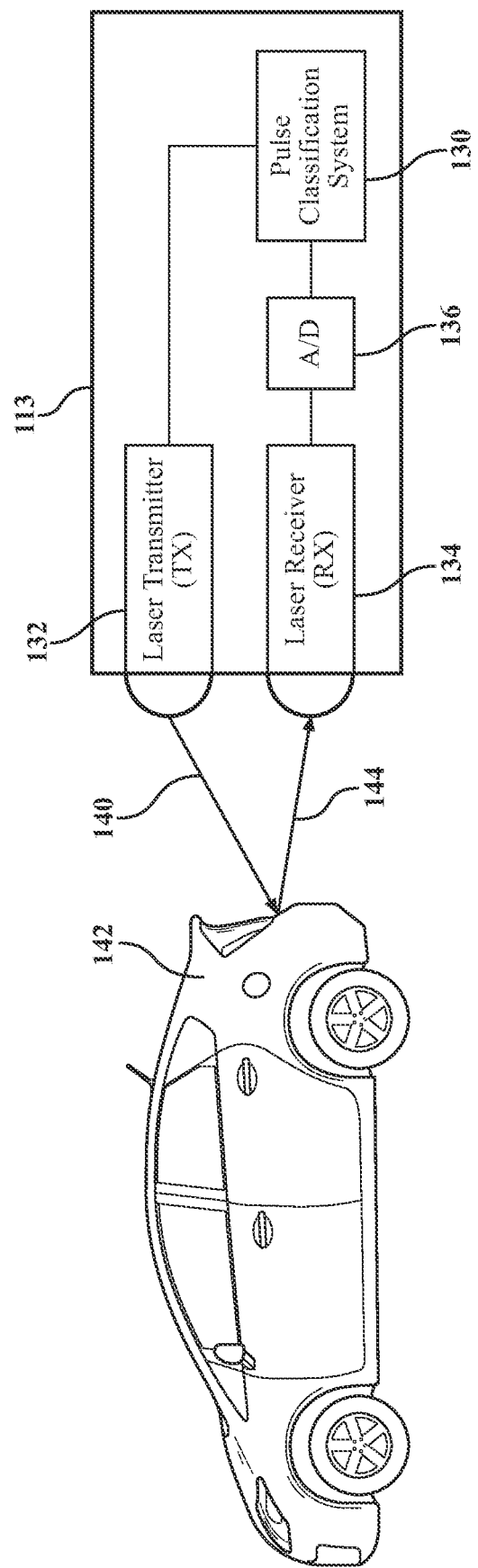
FIG. 2 illustrates a LIDAR sensor having a pulse classification system.

With reference to FIG. 2, a brief description regarding the LIDAR sensor(s) 113 will be provided. It should be understood that this is just but one example of one form of the LIDAR sensor(s) 113. As such, the LIDAR sensor(s) 113 may take different forms. Here, the LIDAR sensor(s) 113 includes a laser transmitter 132 and a laser receiver 134. As it is well known, LIDAR sensors, such as the LIDAR sensor(s) 113, transmit light 140 towards an object, such as another vehicle 142. Reflected light 144 from the vehicle 142 is received by the laser receiver 134. The laser receiver 134 generates an analog signal that may be converted to a digital signal by an analog to digital converter 136. The analog and/or digital signal may include one or more pulses representing a reflection from the vehicle 142. From there, the pulse classification system 130 receives the digital signal from the analog-to-digital converter 136 and then classifies the pulse as a single object pulse or a plurality of object pulse. A single object pulse indicates that the pulse represents a single object, while a plurality of object pulse indicates that the pulse indicates a plurality of objects. In this example, the pulse classification system 130 is part of the LIDAR sensor(s) 113, but it should be equally understood that the pulse classification system 130 may be located outside the LIDAR sensor(s) 113, as shown in FIG. 1.

If the pulse represents a plurality of objects, the plurality of objects could include a solid object, such as the vehicle 142 but could also include other solid objects. Further still, the plurality of objects could include gaseous objects (for example, vehicle exhaust, fog) and/or liquid objects (for example, rain, snow, water splashing from the vehicle's movement through a puddle, etc.). In some cases, the gaseous object and/or the liquid object may be related to a solid object's operation, such as the vehicle 142. Examples of this situation could include the vehicle 142 and exhaust caused by the operation of the vehicle 142 and/or the vehicle 142 and splashing caused by the vehicle 142 traveling through one or more puddles.

Figure 3A:
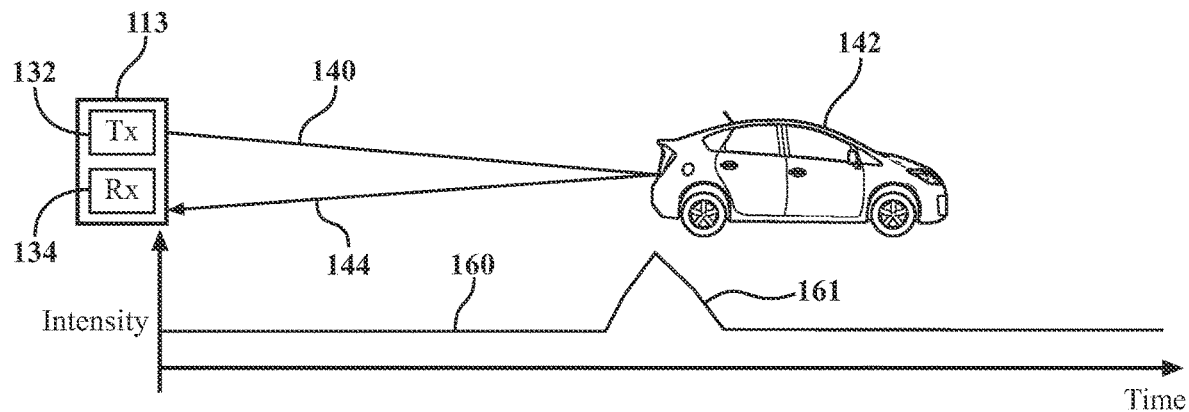
FIGS. 3A-3D illustrate various examples of how floating objects interfere with the pulse generated by a sensor.

To better understand how floating objects impact the pulse generated by the LIDAR sensor(s) 113, reference is made to FIGS. 3A-3D. FIG. 3A illustrates a situation where only one object is present. In this case, the object is the vehicle 142. Like before, the laser transmitter 132 of the LIDAR sensor(s) 113 emits a light 140 towards the object, which is the vehicle 142. The vehicle 142 reflects at least a portion of the light 140 as reflected light 144 received by the laser receiver 134, which generates a signal 160. Here, the signal 160 includes a pulse 161. In this example, the pulse 161, because it is not interfered with by any floating objects, can be utilized to determine the distance to vehicle 142 accurately.

Figure 3B:
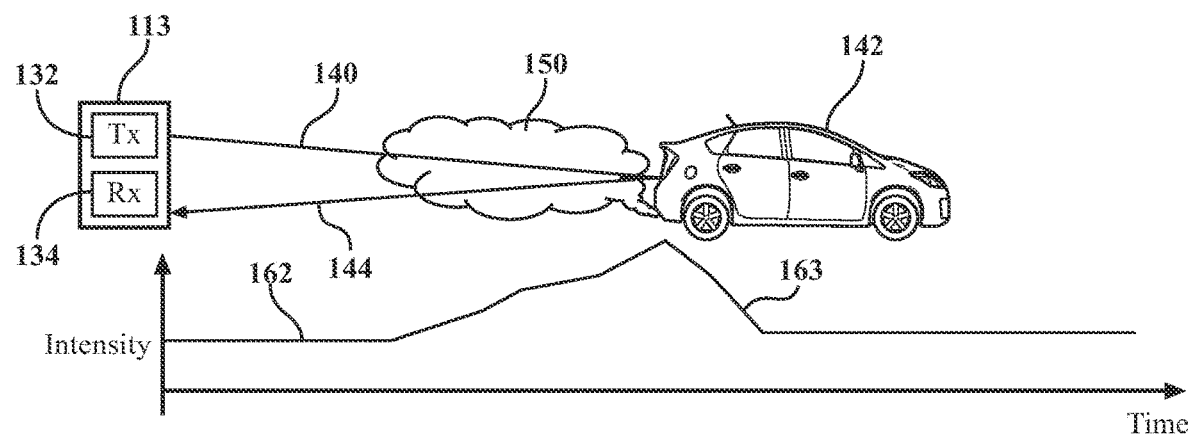

Conversely, with regard to FIG. 3B, this example is similar to the example given in FIG. 3A but includes a floating object in the form of a vehicle exhaust 150. Here, the signal 162 generated by the LIDAR sensor(s) 113 includes a pulse 163 that is stretched out. This stretching of the pulse 163 makes it more difficult to utilize the pulse 163 to determine a distance to the vehicle 142.

Figure 3C:
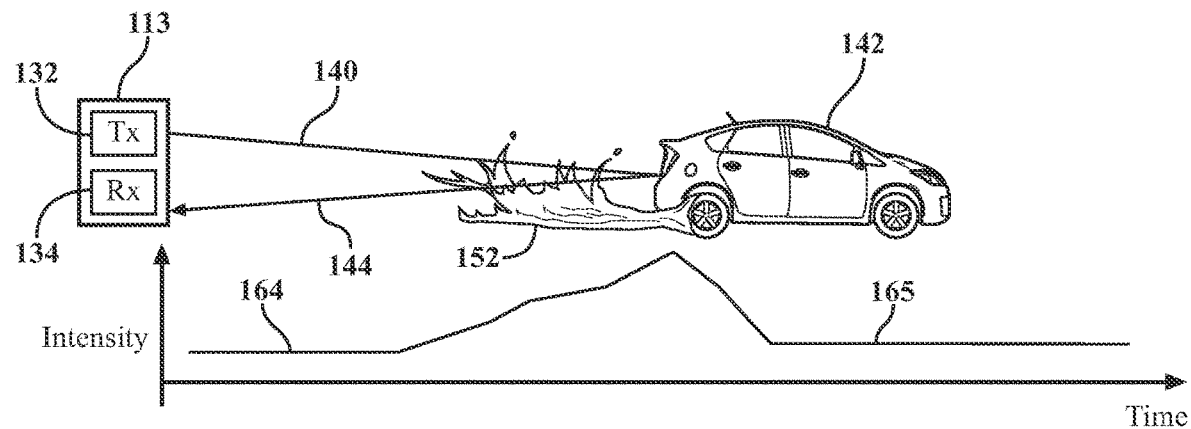

Similarly, with regard to FIG. 3C, this example illustrates a floating object in the form of splashing 152 caused by vehicle 142 as the vehicle drives through either inclement weather and/or a puddle. Here, the signal 164 includes a pulse 165 that is stretched like that described in FIG. 3B.

Figure 3D:
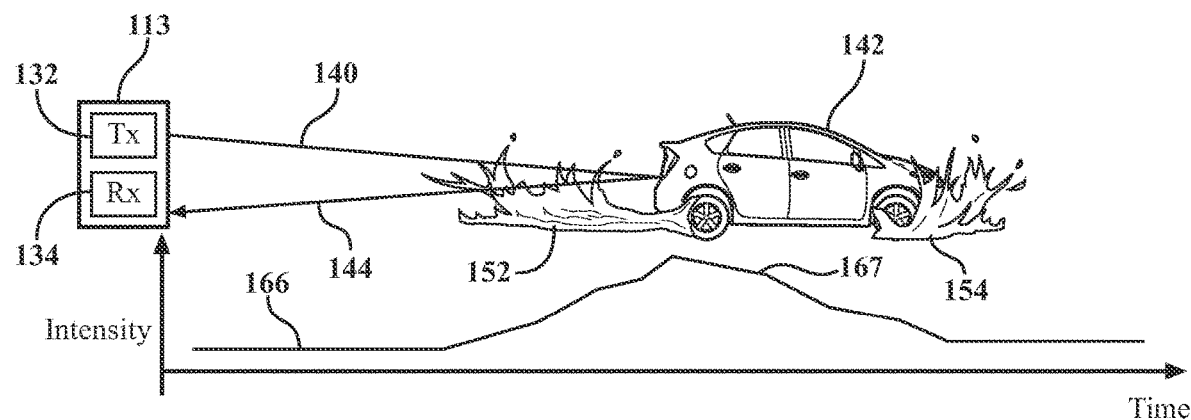

Referring to FIG. 3D, this example illustrates an even more extreme case wherein two floating objects are present. Here, there is splashing 152 behind the vehicle 142 and splashing 154 in front of the vehicle 142. The signal 166 generated by the LIDAR sensor(s) 113 includes a pulse 167 that is further stretched out, making this pulse 167 even more difficult to be utilized to determine the distance to the vehicle 142. As will be explained later in this description, the pulse classification system 130 can determine if the pulse represents a single object, such as the pulse 161 of FIG. 3A, or represents multiple objects, such as the pulses 163, 165, and 167 of FIGS. 3A, 3B, and 3C, respectively.

Figure 4:
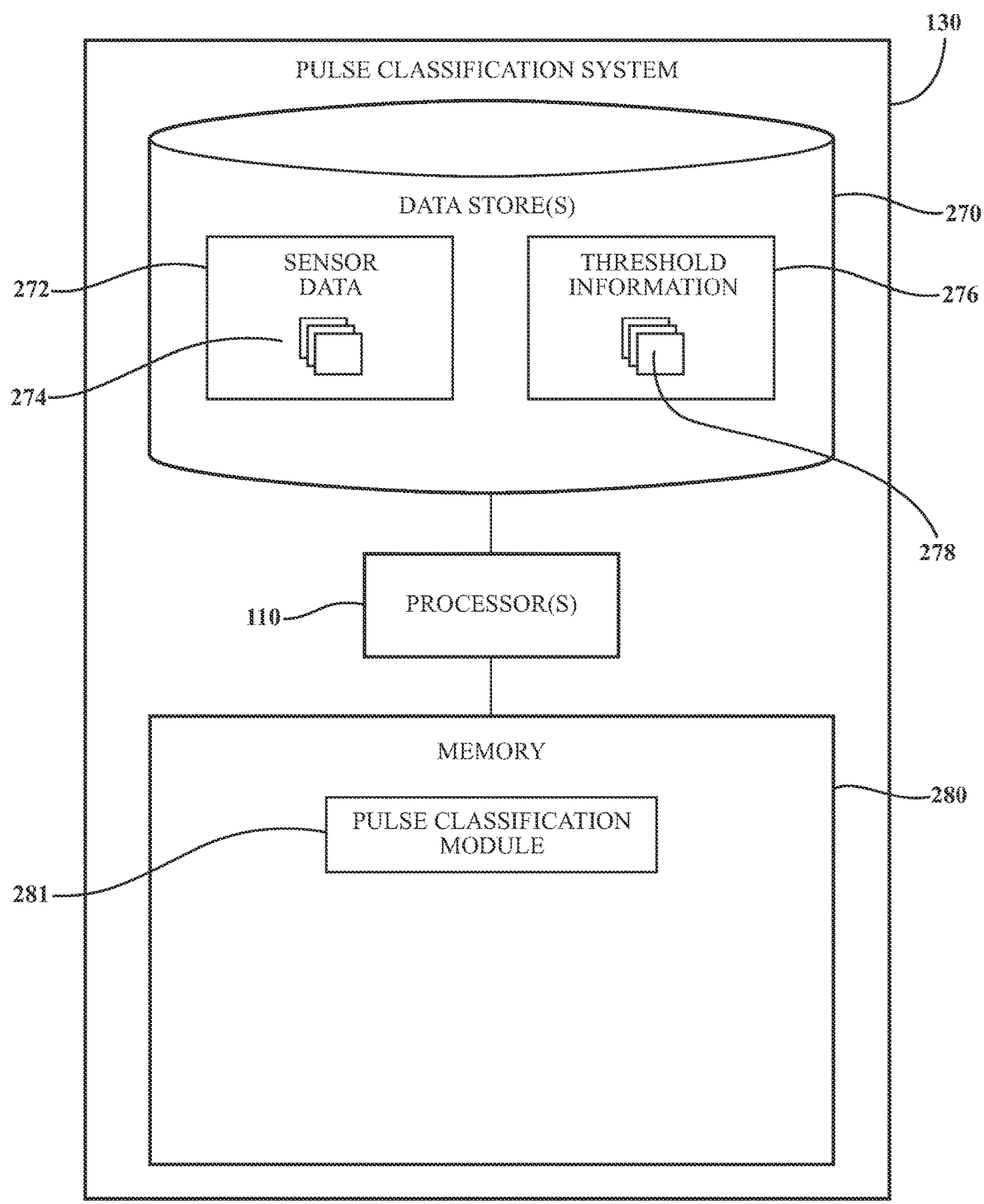
FIG. 4 illustrates a more detailed view of the pulse classification system of FIG. 1.

With reference to FIG. 4, one embodiment of the pulse classification system 130 is further illustrated. As shown, the pulse classification system 130 may include one or more processor(s) 110. Accordingly, the processor(s) 110 may be a part of the pulse classification system 130, or the pulse classification system 130 may access the processor(s) 110 through a data bus or another communication path. In one or more embodiments, the processor(s) 110 is an application-specific integrated circuit that is configured to implement functions associated with a pulse classification module 281.

In general, the processor(s) 110 is an electronic processor such as a microprocessor capable of performing various functions as described herein. In one embodiment, the pulse classification system 130 includes a memory 280 that stores the pulse classification module 281. The pulse classification module 281 is, for example, computer-readable instructions that, when executed by the processor(s) 110, cause the processor(s) 110 to perform the various functions disclosed herein.

Furthermore, in one embodiment, the pulse classification system 130 includes one or more data store(s) 270. The data store(s) 270 is, in one embodiment, an electronic data structure such as a database that is stored in the memory 280 or another memory and that is configured with routines that can be executed by the processor(s) 110 for analyzing stored data, providing stored data, generating stored data, organizing stored data, and so on. Thus, in one embodiment, the data store(s) 270 stores data used or generated by the pulse classification module 281 in executing various functions.

In one embodiment, the data store(s) 270 may store sensor data 272 that may include one or more signals 274. As explained previously, the sensor data may have been generated by the environment sensor(s) 112, which may include information from the LIDAR sensor(s) 113 and/or the other sensor(s) 114. The one or more signals 274 may be similar to the signals previously described in FIGS. 3A-3D and may include one or more pulses.

The data store(s) 270 may also store threshold information 276 containing one or more thresholds 278. The threshold information 276 will be utilized to classify pulses within the one or more signals 274 as being pulses associated with a single object or multiple objects. The thresholds 278 could include thresholds related to a pulse width of the pulse, a rising slope of the pulse during a rising period, a falling slope of the pulse during a falling period, and/or a saturating width of the pulse. The thresholds 278 may be determined through observation wherein, when one of the thresholds is crossed, an indication that a pulse of the one or more signals 274 relates to either a single object or multiple objects. A description of the thresholds 278 will be provided later in this specification.

Regarding the pulse classification module 281, the pulse classification module 281 includes instructions, that when executed by the processor(s) 110, cause the processor(s) 110 to obtain a signal having a pulse from a sensor configured to detect one or more objects. In this example, the sensor may be the LIDAR sensor(s) 113. The signal, as explained previously and as best shown in FIG. 2, is generated by the laser receiver 134 upon receiving reflected light 144 that was reflected by one or more objects, such as the vehicle 142.

The pulse classification module 281 also includes instructions, that when executed by the processor(s) 110, cause the processor(s) 110 to classify the pulse as one of (1) a single object pulse, indicating that the one or more objects represented by the pulse is a single object and (2) a plurality of objects pulse, indicating that the one or more objects represented by the pulse are multiple objects. This classification may be based on a pulse width of the pulse, a rising slope of the pulse during a rising period, a falling slope of the pulse during a falling period, and/or a saturating width of the pulse.

Figure 5:
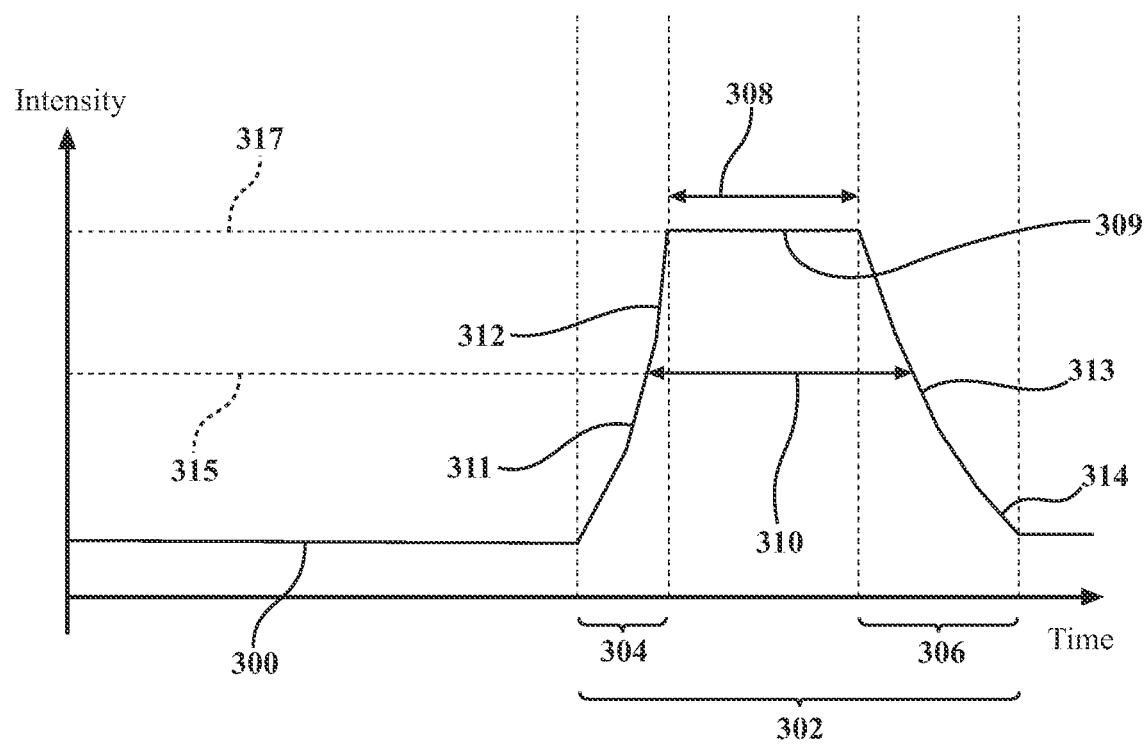
FIG. 5 illustrates a detailed view of a signal from a sensor having a pulse.

To better understand elements associated with a pulse, reference is made to FIG. 5, which illustrates a signal 300 having a pulse 302. Here, the pulse 302 includes several sections. Starting on the left-hand side, the pulse 302 includes a rising period 304, followed by a falling period 306. In this example, the pulse 302 is saturated and thus has a saturated portion 309 located between the rising period 304 and the falling period 306. Saturation can be caused when the reflected signal is of such strength that the laser receiver 134 is saturated. This may occur in certain situations where the reflected light 144 was reflected from a high reflection surface. However, it should be understood that the pulse 302 may not necessarily be saturated as shown.

The rising period 304 generally includes a rising slope 311 that has a maximum rising slope 312. The falling period 306 includes a falling slope 313 that includes a minimum falling slope 314. Regarding the maximum rising slope 312, the maximum rising slope 312 is the maximum slope during the rising period 304 of the pulse 302. Regarding the minimum falling slope 314, the minimum falling slope 314 is the most downward slope in the falling period 306.

Also of note, the saturating width 308 may be the width of the saturated portion 309 of the pulse 302. The pulse 302 may also have a pulse width 310, which may be measured as the width between the rising period 304 of the pulse 302 and the falling period 306 of the pulse 302. The pulse width 310 may be measured across the pulse 302 at a signal intensity 315, which is approximately two-thirds of the peak signal intensity 317. However, it should be understood that the pulse width 310 may be measured at different signal intensities.

Figure 6A:
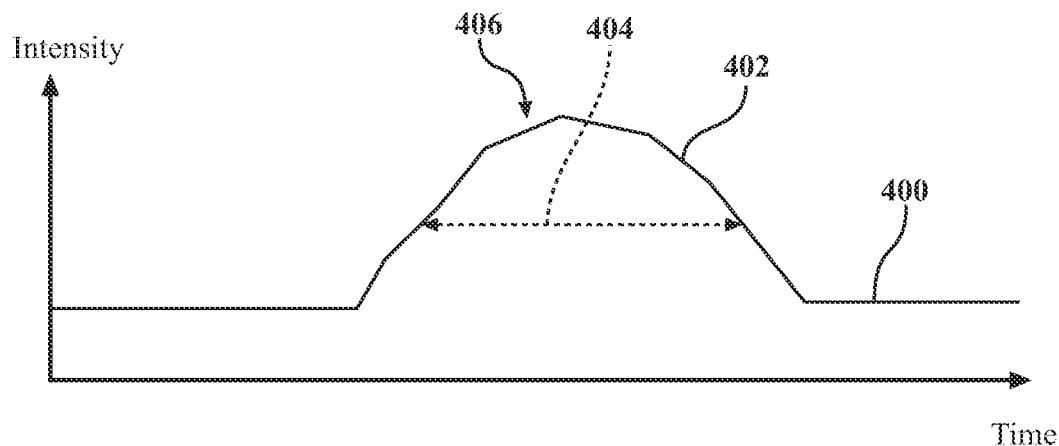
FIGS. 6A and 6B illustrate one example of classifying a pulse of a signal generated from a sensor using an unsaturated signal's pulse width.
Figure 6B:
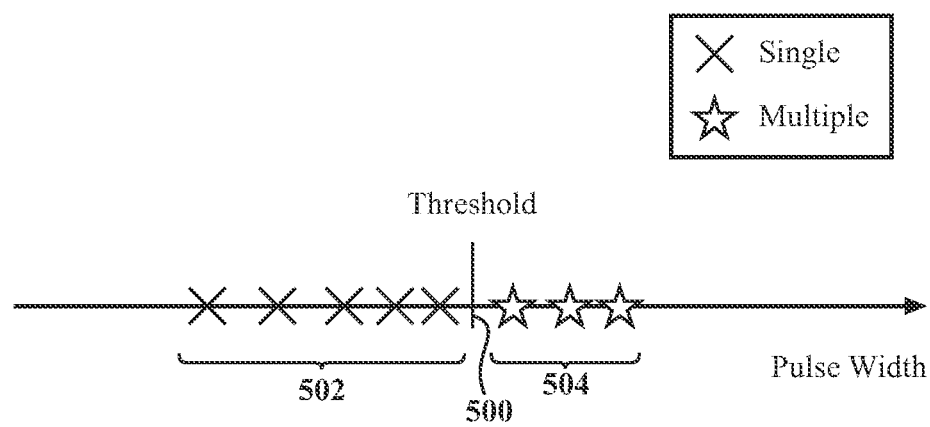

Referring to FIG. 6A, illustrated is a signal 400 having a pulse 402. The signal 400 having the pulse 402 may have been generated by a sensor, such as the LIDAR sensor(s) 113, when detecting one or more objects. In this example, the pulse 402 is not saturated, as indicated by having a rounded peak 406. Here, the pulse 402 represents a pulse generated when multiple objects reflect light from the sensor. In this case, the multiple objects may be a vehicle and a floating object. An example of this scenario is shown in FIGS. 3A and 3C, wherein these examples illustrate a vehicle 142 obscured by a floating object, such as the vehicle exhaust 150 of the vehicle 142 or splashing 152 caused by the movement of the vehicle 142. Additionally, the pulse 402 has a pulse width 404.

In this example, the pulse classification module 281 causes the processor(s) 110 to measure the pulse width 404 of the pulse 402. The pulse classification module 281 then causes the processor(s) 110 to classify the pulse 402 as a plurality of objects pulse when the pulse width 404 is greater than a pulse width threshold, which may be one of the thresholds 278. As such, Referring to FIG. 6B, this figure illustrates a threshold 500. Pulse widths 502 of pulses below the threshold 500 are classified as a single object pulse, while pulse widths 504 of pulses above the threshold 500 are classified as a multiple object pulse.

The threshold 500 may be determined through experimentation and may vary based on the type of application and the type of sensor utilized. As such, through experimentation, the threshold 500 can be determined that when a pulse width 404 is above the threshold 500, the pulse width 404 indicates multiple objects, while a pulse width that is less than the threshold 500 would indicate a single object. As stated before, the multiple objects may include multiple solid objects, liquid objects, and/or gaseous objects. This information that the pulse relates to either a single object or multiple objects may be provided to the object detection system 125 and/or the motion planning system 126 of FIG. 1. The systems may utilize this information to more accurately detect objects, track objects, and/or perform more accurate motion planning.

Figure 7A:
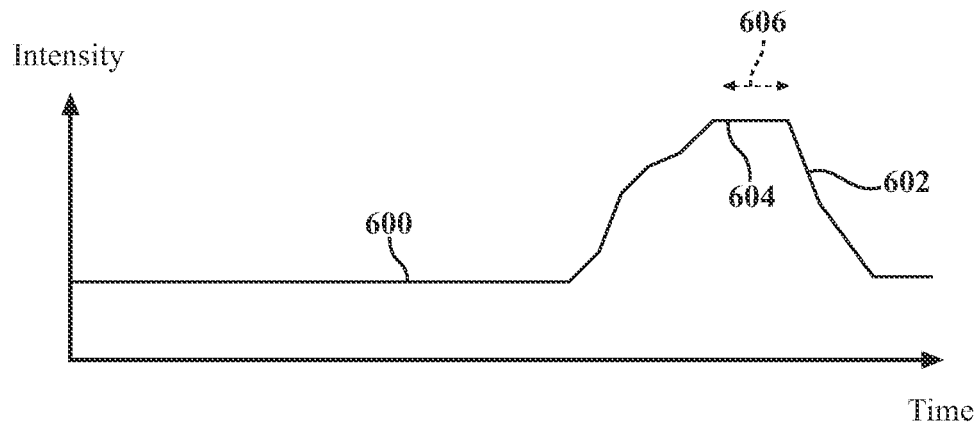
FIGS. 7A and 7B illustrate one example of classifying a pulse of a signal generated from a sensor using the saturating width of a saturated signal.

Referring to FIG. 7A, another example of a signal 600 having a pulse 602 is shown. In this example, the pulse 602 is saturated and thus has a saturated portion 604. In other words, the peak values of the pulse 602 are above the peak signal intensity of the sensor. This may occur in situations where light was reflected by a highly reflective object, such as a vehicle reflector. The pulse 602 relates to multiple objects, such as a vehicle and splashing caused by the vehicle's motion, such as shown and described in FIGS. 3A and 3B.

Here, the pulse classification module 281 causes the processor(s) 110 to measure the saturating width 606 of the saturated portion 604 of the pulse 602. When the saturating width 606 of the pulse 602 is less than a saturating width threshold, the pulse classification module 281 causes the processor(s) 110 to classify the pulse 602 as a plurality of objects pulse. The saturating width threshold may be determined through experimentation and may vary based on the type of application and the type of sensor utilized.

Figure 7B:
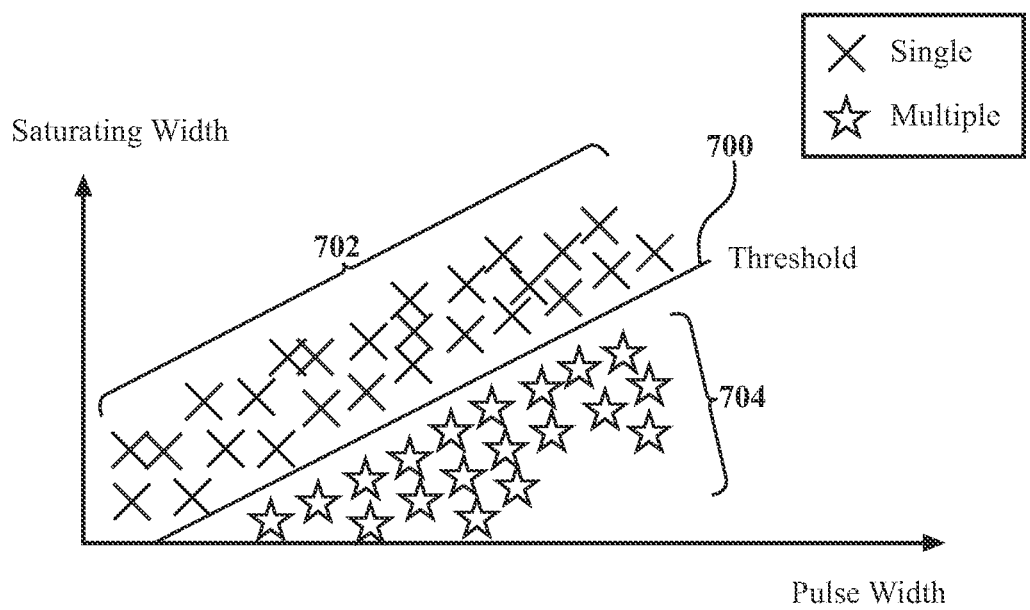

Moreover, referring to FIG. 7B, this example illustrates the saturating width threshold 700. Like before, the saturating width threshold 700 may be one of the thresholds 278. The saturating width threshold 700 may be determined through experimentation and may vary based on the type of application and the type of sensor utilized. In situations where the saturating width 702 is above the saturating width threshold 700, the pulse classification module 281 causes the processor(s) 110 to determine that the pulse relates to a single object and should be classified as a single object pulse. Conversely, if the saturating width 704 is below the saturating width threshold 700, the pulse classification module 281 causes the processor(s) 110 to determine that the pulse relates to multiple objects and should be classified as a multiple object pulse. Like before, this information may be provided to another system, such as the object detection system 125 and/or the motion planning system 126 of FIG. 1.

Figure 8A:
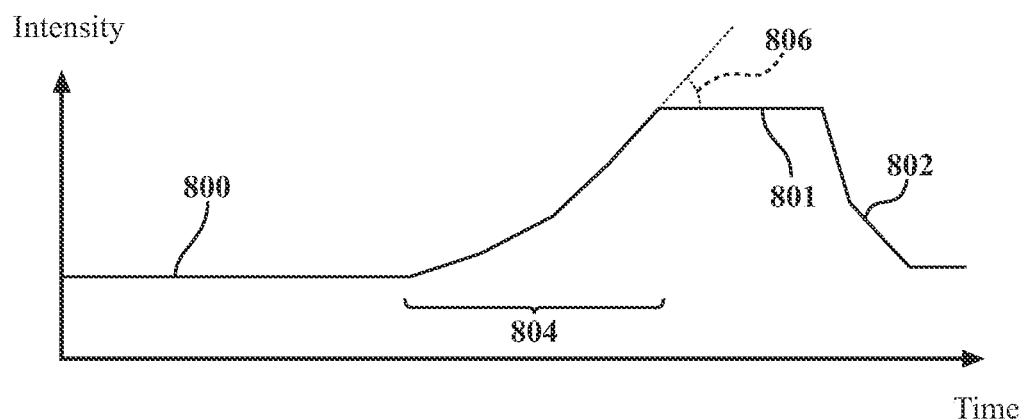
FIGS. 8A and 8B illustrate one example of classifying a pulse of a signal generated from a sensor using a maximum rising slope of the pulse.

Referring to FIG. 8A, a signal 800 is shown having a pulse 802 that is saturated, as shown in a saturated pulse portion 801. The pulse 802 relates to multiple objects that may be generated by the reflections of light from, for example, a solid object and a floating object, such as previously described in FIGS. 3B and 3C. The pulse 802 includes a maximum rising slope 806 that occurs during a rising period 804 of the pulse 802. Here, the pulse classification module 281 causes the processor(s) 110 to classify the pulse 802 as a plurality of objects pulse when the maximum rising slope 806 is less than a maximum rising slope threshold. The maximum rising slope threshold may be determined through experimentation and may vary based on the type of application and the type of sensor utilized.

Figure 8B:
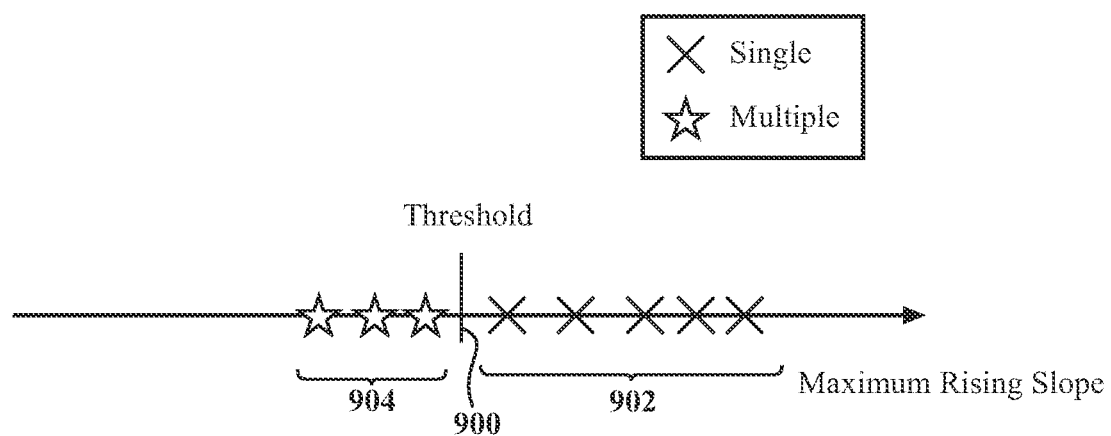

For example, referring to FIG. 8B, this figure illustrates a maximum rising slope threshold 900. The maximum rising slope values 902 that are below the maximum rising slope threshold 900 are classified as multiple object pulses. Conversely, maximum rising slope values 904 that are above the maximum rising slope threshold 900 are classified as single object pulses. Like before, this information may be provided to another system, such as the object detection system 125 and/or the motion planning system 126 of FIG. 1.

Figure 9A:
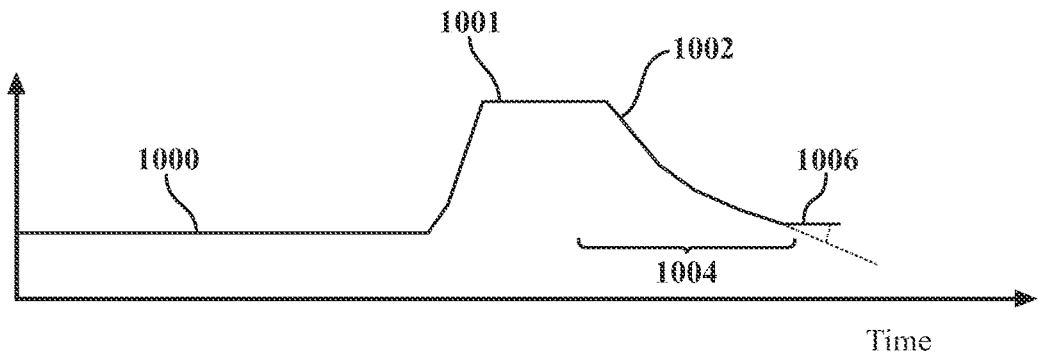
FIGS. 9A and 9B illustrate one example of classifying a pulse of a signal generated from a sensor using a minimum falling slope of the pulse.

Referring to FIG. 9A illustrated is a signal 1000 having a pulse 1002 that has a saturated portion 1001. In this example, the pulse 1002 may relate to an example similar to the example shown and described in FIG. 3D, wherein splashes 152 and 154 are located on opposing sides of the vehicle 142. In this type of situation, the pulse classification module 281 causes the processor(s) 110 to classify the pulse 1002 as a plurality of objects pulse when a minimum falling slope 1006 during the falling period 1004 of the pulse 1002 is greater than a first minimum falling slope threshold and less than a second minimum falling slope threshold Like before, the first minimum falling slope threshold and the second minimum falling slope threshold may be determined through experimentation and may vary based on the type of application and the type of sensor utilized.

Figure 9B:
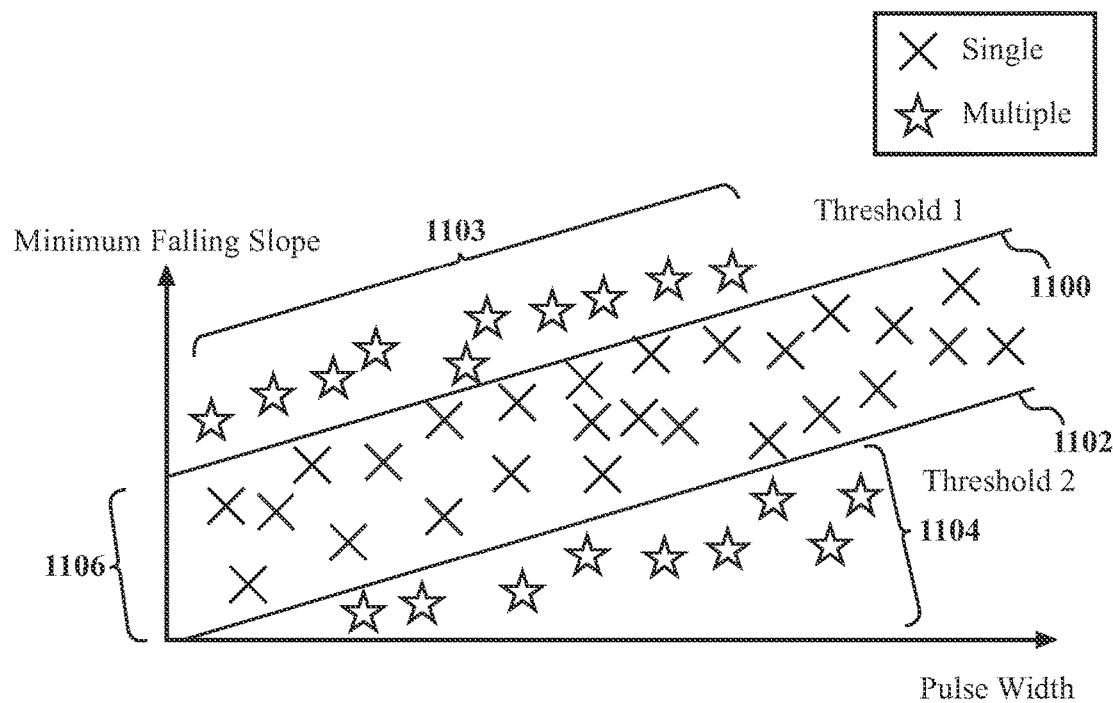

As such, referring to FIG. 9B this figure illustrates two thresholds—a first minimum falling slope threshold 1100 and a second minimum falling slope threshold 1102. Pulses with minimum falling slopes 1103 above the first minimum falling slope threshold 1100 are classified as multiple object pulses. In addition, pulses with minimum falling slopes 1104 located below the second minimum falling slope threshold 1102 are classified as multiple object pulses. Pulses with minimum falling slopes 1106 located between the first minimum falling slope threshold 1100 and the second minimum falling slope threshold 1102 are classified as single object pulses.

Figure 10:
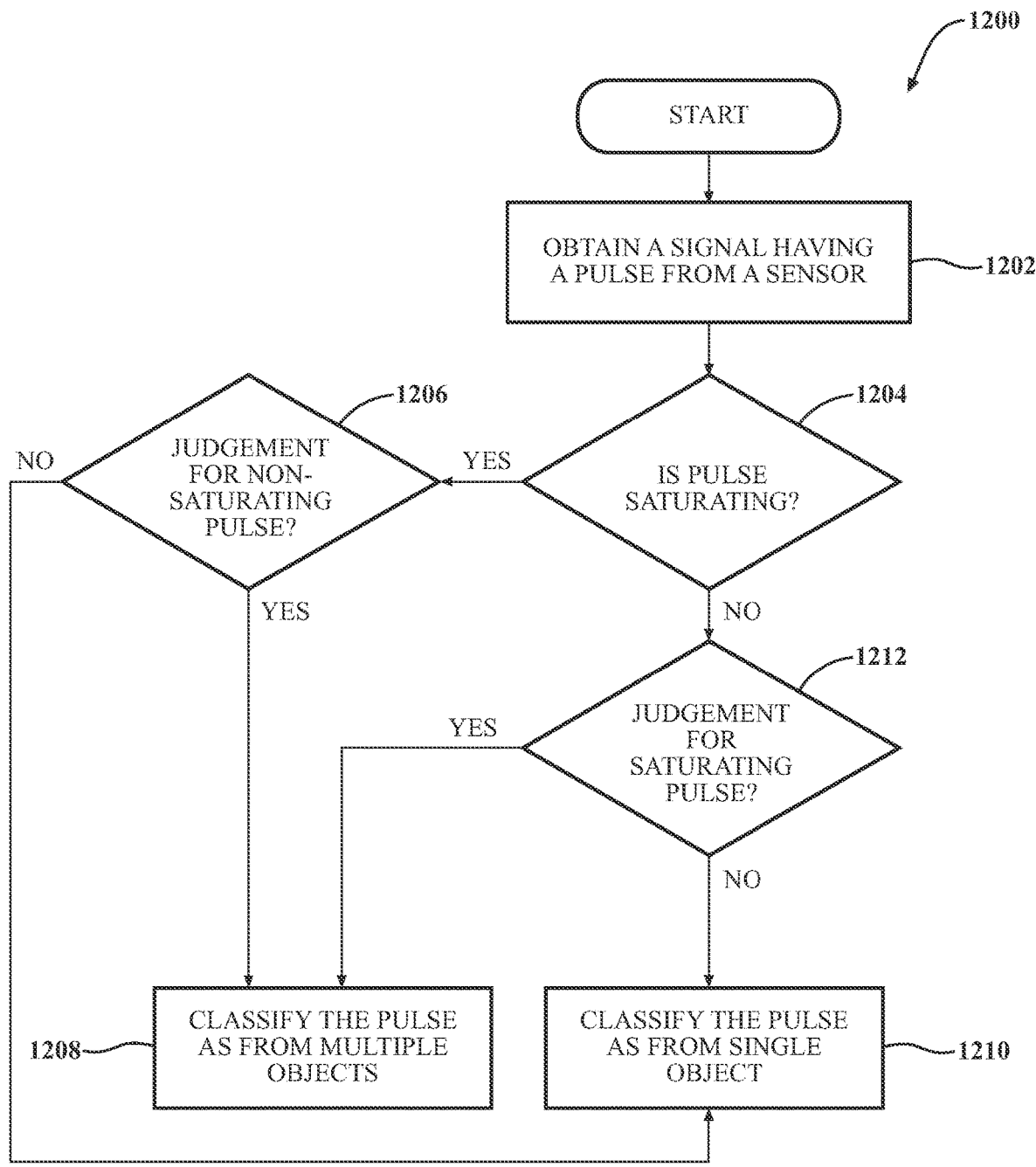
FIG. 10 illustrates a method for classifying pulses generated by a sensor.

Referring to FIG. 10, a method 1200 for classifying pulses as either single object pulses or multiple object pulses is shown. The method 1200 will be described from the viewpoint of the vehicle 100 of FIG. 1 and the pulse classification system 130 of FIG. 4. However, it should be understood that this is just one example of implementing the method 1200. While the method 1200 is discussed in combination with the pulse classification system 130, it should be appreciated that the method 1200 is not limited to being implemented within the pulse classification system 130 but is instead one example of a system that may implement the method 1200.

In step 1202, the pulse classification module 281 includes instructions, that when executed by the processor(s) 110, cause the processor(s) 110 to obtain a signal having a pulse from a sensor configured to detect one or more objects. In this example, the sensor may be the LIDAR sensor(s) 113. The signal, as explained previously and as best shown in FIG. 2, is generated by the laser receiver 134 upon receiving reflected light 144 that was reflected by one or more objects, such as the vehicle 142.

In step 1204, the pulse classification module 281 includes instructions, that when executed by the processor(s) 110, cause the processor(s) 110 to determine if the pulse within the obtained signal is saturating are not. Moreover, a determination is made if the pulse's peak values are above the sensor's peak signal intensity. This may occur in situations where light was reflected by a highly reflective object, such as a vehicle reflector.

If the pulse is saturating as previously determined in step 1204, the method proceeds to step 1206, wherein a judgment for a non-saturating pulse is performed. The judgment for a non-saturating pulse was previously shown and described in FIGS. 6A and 6B. Moreover, in step 1206, the pulse classification module 281 causes the processor(s) 110 to measure the pulse width of the previously obtained pulse. The pulse classification module 281 then causes the processor(s) 110 to classify the pulse as a plurality of objects pulse when the pulse width is greater than a pulse width threshold (step 1208). Conversely, the pulse classification module 281 causes the processor(s) 110 to classify the pulse as a single object pulse when the pulse width is less than a pulse width threshold (step 1210).

Returning to step 1204, if it is determined that the obtained pulse is saturating, the method 1200 proceeds to step 1212, wherein a judgment for a saturating pulse is performed. These judgments were previously shown and described in the FIGS. 7A, 7B, 8A, 8B, 9A, and 9B. Moreover, the pulse classification module 281 causes the processor(s) 110 to classify the pulse as a plurality of objects pulse (step 1208) when any of the following is true:
  the saturating width of the pulse is less than a saturating width threshold (shown and described in FIGS. 7A and 7B),
  a maximum rising slope value during the rising period of the pulse is less than a maximum rising slope threshold (shown and described in FIGS. 8A and 8B), and/or
  a minimum falling slope during the falling period of the pulse is greater than a first minimum falling slope threshold and less than a second minimum falling slope threshold (shown and described in FIGS. 9A and 9B).

Conversely, if all the above are false, the pulse classification module 281 then causes the processor(s) 110 to classify the pulse as a single object pulse (step 1210).

By performing additional analysis of a pulse from a signal as shown and described in the method 1200, a determination can be made if the pulse represents a single object or multiple objects. As stated previously, the multiple objects can be solid objects, liquid objects, or gaseous object. Furthermore, the multiple objects may be caused by the operation of one of the objects. For example, a vehicle, which is a solid object, can cause the formation of a gaseous object (vehicle exhaust) or liquid object (splashing caused by the movement of the vehicle). Other downstream tasks, such as object detection, object tracking, and/or motion planning, can function more accurately using this additional information.

FIG. 1 will now be discussed in full detail as an example environment within which the system and methods disclosed herein may operate. In one or more embodiments, the vehicle 100 is an autonomous vehicle, but could also be a nonautonomous or semi-autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include the processor(s) 110. In one or more arrangements, the processor(s) 110 can be a main processor of the vehicle 100. For instance, the processor(s) 110 can be an electronic control unit (ECU). The vehicle 100 can include one or more environment sensor(s) 112, which may include one or more LIDAR sensor(s) 113 and/or other sensor(s) 114. These other sensor(s) 114 could include radar sensors, sonar sensors, camera sensors, or any sensor that generates a pulse in response to detecting one or more objects. "Sensor" means any device, component, and/or system that can detect and/or sense something. The one or more sensors can be configured to detect, and/or sense in real-time. As used herein, the term "real-time" means a level of processing responsiveness that a user or system senses as sufficiently immediate for a particular process or determination to be made or that enables the processor to keep up with some external process.

The vehicle 100 can include an input system 122. An "input system" includes any device, component, system, element, or arrangement or groups that enable information/data to be entered into a machine. The input system 122 can receive an input from a vehicle passenger (e.g., a driver or a passenger). The vehicle 100 can include an output system 123. An "output system" includes any device, component, or arrangement or groups thereof that enable information/data to be presented to a vehicle passenger (e.g., a person, a vehicle passenger, etc.).

The vehicle 100 can include a motion planning system 126 and/or an object detection system 125. In one example, the motion planning system 126 may control the movement of the vehicle 100. The object detection system 125 may utilize information from the environment sensor(s) 112 and/or the pulse classification system 130 to detect and/or track objects external to the vehicle 100.

The vehicle 100 can include one or more vehicle control system(s) 116. Various examples of the vehicle control system(s) 116 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a steering control 118 for controlling the steering of the vehicle 100, a throttle control 119 for controlling the throttle of the vehicle 100, a braking control 120 for controlling the braking of the vehicle 100, and/or a transmission control 121 for controlling the transmission and/or other powertrain components of the vehicle 100. Each of these systems can include one or more devices, components, and/or a combination thereof, now known or later developed.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In this document's context, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. For example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising the steps of:
   obtaining a signal having a pulse from a sensor configured to detect one or more objects; and
   classifying the pulse as one of: (1) a single object pulse indicating that the one or more objects represented by the pulse is a single object and (2) a plurality of objects pulse indicating that the one or more objects represented by the pulse are multiple objects based on a saturating width of the pulse.

2. The method of claim 1, wherein the sensor is a light detection and ranging sensor.

3. The method of claim 2, wherein the light detection and ranging sensor is mounted to a vehicle.

4. The method of claim 1, further comprising the step of classifying the pulse as the plurality of object pulse when the saturating width of the pulse is less than a saturating width threshold.

5. The method of claim 1, wherein the one or more objects include one or more of a gaseous object, a liquid object, and a solid object.

6. The method of claim 5, wherein the gaseous object or the liquid object is related to an operation of the solid object.

7. A system comprising:
   a processor;
   a memory in communication with the processor, the memory having a pulse classification module, the pulse classification module having instructions that, when executed by the processor, cause the processor to:
   obtain a signal having a pulse from a sensor configured to detect one or more objects; and
   classify the pulse as one of: (1) a single object pulse indicating that the one or more objects represented by the pulse is a single object and (2) a plurality of objects pulse indicating that the one or more objects represented by the pulse are multiple objects based on a saturating width of the pulse.

8. The system of claim 7, wherein the sensor is a light detection and ranging sensor.

9. The system of claim 8, wherein the light detection and ranging sensor is mounted to a vehicle.

10. The system of claim 7, wherein the pulse classification module further includes instructions that, when executed by the processor, cause the processor to classify the pulse as the plurality of object pulse when
    the saturating width of the pulse is less than a saturating width threshold.

11. The system of claim 7, wherein the one or more objects include one or more of a gaseous object, a liquid object, and a solid object.

12. The system of claim 11, wherein the gaseous object or the liquid object is related to an operation of the solid object.

13. A non-transitory computer-readable medium storing instructions that, when executed by a processor, cause the processor:
    obtain a signal having a pulse from a sensor configured to detect one or more objects; and
    classify the pulse as one of: (1) a single object pulse indicating that the one or more objects represented by the pulse is a single object and (2) a plurality of objects pulse indicating that the one or more objects represented by the pulse are multiple objects based on a saturating width of the pulse.

14. The non-transitory computer-readable medium of claim 13, wherein the sensor is a light detection and ranging sensor.

15. The non-transitory computer-readable medium of claim 14, wherein the light detection and ranging sensor is mounted to a vehicle.

16. The non-transitory computer-readable medium of claim 13, further storing instructions that, when executed by the processor, cause the processor to classify the pulse as the plurality of object pulse when
    the saturating width of the pulse is less than a saturating width threshold.

17. The non-transitory computer-readable medium of claim 13, wherein the one or more objects include one or more of a gaseous object, a liquid object, and a solid object and the gaseous object or the liquid object is related to an operation of the solid object.

* * * * *